United States Patent
Johnson

(10) Patent No.: US 6,588,264 B1
(45) Date of Patent: *Jul. 8, 2003

(54) PRESSURE INDICATING DEVICES

(75) Inventor: Richard Christopher Holdas Johnson, La Massana (AD)

(73) Assignee: Innovative Enterprises Limited, Europort (GI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/180,306
(22) PCT Filed: May 7, 1996
(86) PCT No.: PCT/GB96/01086
§ 371 (c)(1), (2), (4) Date: Feb. 8, 1999
(87) PCT Pub. No.: WO97/42044
PCT Pub. Date: Nov. 13, 1997

(51) Int. Cl.$^7$ .............................................. B60C 23/02
(52) U.S. Cl. ..................... 73/146.8; 73/146.4; 73/146.2
(58) Field of Search ....................... 73/715, 146, 146.2, 73/146.3, 146.4, 146.5, 146.8; 116/34 R

(56) References Cited

U.S. PATENT DOCUMENTS

| | | | | |
|---|---|---|---|---|
| 3,697,944 A | * | 10/1972 | Murano | 340/58 |
| 4,366,708 A | * | 1/1983 | Warihashi | 73/146.8 |
| 4,384,543 A | * | 5/1983 | Wong | 116/34 R |
| 4,465,013 A | * | 8/1984 | Malec | 73/146.8 |
| 4,476,803 A | * | 10/1984 | Malec | 116/34 R |
| 4,606,391 A | * | 8/1986 | Achterholt | 73/146.8 |
| 4,819,686 A | * | 4/1989 | Achterholt | 137/229 |
| 5,557,256 A | * | 9/1996 | Achterholt | 73/146.4 |
| 5,774,048 A | * | 6/1998 | Achterholt | 340/447 |
| 5,929,330 A | * | 7/1999 | Ford | 73/146.8 |
| 6,006,600 A | * | 12/1999 | Cheng | 73/146.5 |

* cited by examiner

*Primary Examiner*—Harshad Patel
(74) *Attorney, Agent, or Firm*—Breiner & Breiner, L.L.C.

(57) ABSTRACT

A pressure indicating device, e.g. for securing to a tire valve, is disclosed. The device includes a flexible impermeable diaphragm on one wall of a permanently hermetically sealed chamber is pressurized to a given pressure. A mechanical linkage moves depending on whether the pressure, e.g. in a tire to which the device is attached, is greater or less than that in the chamber, e.g., rotates a bicolored ball so that the color displayed provides a visual signal that indicates if the tire pressure is above or below the given pressure. This enables a puncture or air loss to be detected by a rapid glance.

15 Claims, 2 Drawing Sheets

PRESSURE INDICATING DEVICES

Figure 1:
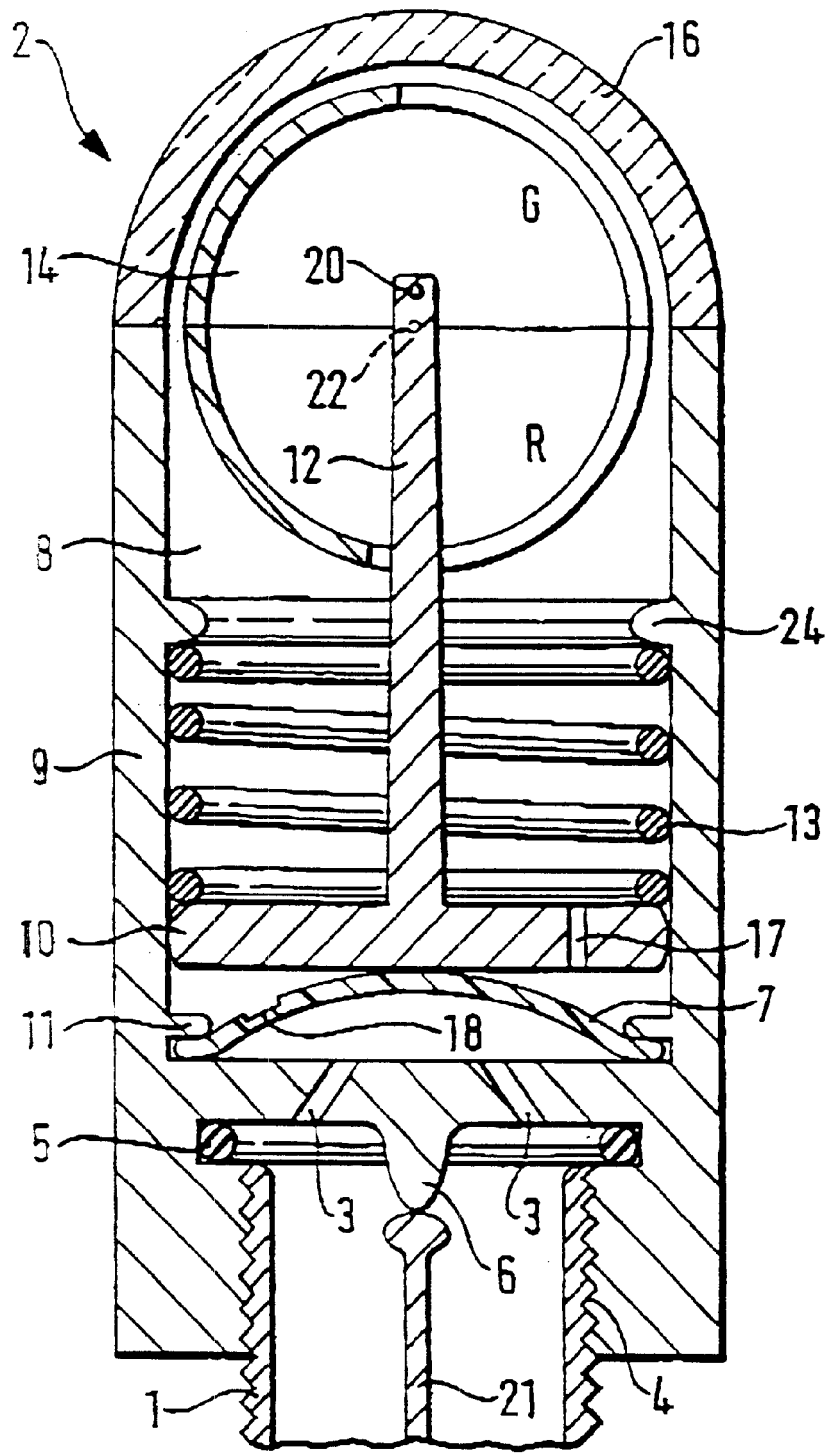

This invention relates to pressure indicating devices and particularly but not exclusively to such devices for indicating vehicle tyre pressure.

A wide variety of pressure indicating devices have been known for some time, the majority being devices which provide a means to accurately measure pressure, particularly of gases and liquids.

In certain situations, a precise measurement of pressure is not required but rather a simple and clear indication of a change in pressure is desired, for example to detect leakage from a pressurised container. In such situations, a device which provides a highly visual "see-at-a-glance" indication that leakage is occurring is more appropriate than a precise numerical measurement of the pressure within the container.

Such devices are well known in the art. For example, a device is known for indicating whether a pneumatic circuit is pressurised, available under the trade mark ROTOWINK (ex Norgren Martonair Limited). This device is adapted to be mounted on a control panel, with the inlet connected to part of a pneumatic circuit, e.g. a pressure vessel, such as a compressor reservoir. The device contains a flexible, impermeable diaphragm that spans the inlet. The diaphragm supports a spring returnable piston.

A rod and crank arrangement extends from the piston, terminating in the head of the device, remote from the inlet, where the rod is attached to a crank within a rotatable ball having its opposite halves different colours, e.g. red and green. The ball is mounted beneath a lens through which one side of the ball is clearly visible from the exterior of the device.

A difference in pressure across the diaphragm, e.g. resulting from a build up of air pressure in a compression chamber to which the inlet of the device is connected, causes the diaphragm to flex towards the head of the device, which pushes the piston and rod towards the head. This movement causes the crank to cause the ball to rotate such that the other side of the ball is then visible through the lens. This other ball side of contrasting colour provides a clear visual signal that pressure has built up in the chamber.

It is highly desirable for vehicle tyres to remain at their optimum pressure for reasons of safety, fuel economy and comfort and to prolong the life of the tyres. Consequently, it is preferable that tyre pressures are checked at regular intervals. However, this mundane task is frequently overlooked since a lower than optimal tyre pressure, such as caused by a slow puncture or an inaccurate gauge on a pump or compressed air supply unit, is only perceived when the tyre looks dangerously flat and/or the vehicle feels uncomfortable, at which stage the tyre pressure is well below its optimum. Clearly, in the period between initial loss of air pressure and detection, any use of the vehicle reduces the life of the tyre significantly and will have put the driver and passengers of the vehicle at some risk.

Although it occurs less often, it is also potentially dangerous to drive a vehicle with one or more of its tyres grossly over inflated rather than under inflated.

Attempts have been made in the past to provide tyre pressure monitoring devices. U.S. Pat. No. 4,814,745 describes a cap for attachment to a tyre valve following inflation and which includes an alarm circuit which is de-energised when the tyre is inflated to proper pressure. The cap, however, must include its own power supply and other circuit members which is undesirably complex, prone to failure and expensive.

U.S. Pat. No. 4,819,686 discloses a purely mechanical device including a diaphragm in a chamber. The diaphragm may be deflected to give a visual indication of the state of pressure within the tyre. One side of the diaphragm is a so-called reference chamber which, when the device is applied to a tyre valve stem, is pressurised to the pressure within the tyre. Thereafter the reference chamber is sealed while the other side of the diaphragm is exposed to the pressure within the tyre, so that if the latter drops, the diaphragm moves. The construction is relatively complex and the cap provides no indication as to whether the tyre is inflated to the correct pressure. The device is only effective to show a drop in pressure over time. British patent specification 2277802 discloses a similar device but in which an indication of the state of pressure in the tyre is achieved only with the use of a hand held device adapted to be brought into close proximity with the cap on the valve stem. It suffers from the same disadvantage as noted above.

U.S. Pat. No. 2,689,481 describes a tyre pressure indicating device comprising a housing which may be screwed on to a tyre valve stem and which includes an inlet for air under pressure from the tyre into a transparent walled chamber. The chamber contains a hermetically sealed bellows, the degree of compression of which changes its length to provide, in conjunction with markings on the exterior of the chamber, an indication of tyre pressure.

According to the present invention there is provided a pressure indicating device comprising a housing which includes an inlet for air under pressure, a permanently hermetically sealed chamber including a gas under pressure, a flexible member between the inlet and the chamber, and a signalling device, the signal from which depends on the pressure difference between the inlet and the chamber, and characterised in that the flexible member is a flexible impermeable diaphragm which, as the pressure at the inlet increases, is caused to flex to extend into the pressurised chamber, and in that the device includes connecting means between the diaphragm and the signalling device adapted to actuate the signalling device to provide a signal representative of the inlet pressure relative to that in the sealed chamber. The signalling device is preferably located within the sealed chamber.

When such a device is to be used as a tyre pressure indicating device, the inlet may be adapted to form sealed contact with the valve when the device is fitted to the tyre valve stem in place of the conventional dustcap and, as it is screwed further on, to open the tyre valve so that the pressure in the inlet is the same as that in the tyre.

Preferably the chamber is pressurised to a pressure just below that of the optical tyre pressure for a particular vehicle, (the optimal tyre pressures being taken to be those recommended by the vehicle manufacturers). Consequently, when the device is connected to and opens the valve, the pressure differential between the higher pressure of the tyre and the lower pressure of the chamber causes the flexible impermeable diaphragm to flex, such that it extends into the pressurised chamber, and to actuate the signalling device to provide a signal representative of the tyre pressure relative to that in the sealed chamber.

The diaphragm construction may be a flat disc type or (and this may improve service life and sensitivity of the diaphragm) a rolling diaphragm.

Preferably the signalling device is capable of providing at least two visually distinguishable signals. This is most conveniently achieved by a mechanical means such as a rotatable mounted ball of which one side is one colour and the other a contrasting colour but as will be appreciated, any mechanical means of providing such signals may be substituted. The signal is preferably clearly visible over a wide range of viewing angles, e.g. a viewing angle of 110° or more.

The means connecting the flexible impermeable diaphragm to the signalling device are preferably simple mechanical linkages capable of transmitting any movement of the diaphragm, in a manner which actuates the signalling device. Most preferably a spring returnable piston carrying an elongate member is mounted on the diaphragm, the end of the member being pivoted to a crank which is attached to a rotatable ball signalling device. In use, any flexing or flattening of the diaphragm will accordingly rotate the ball in one sense or the other.

In accordance with a particular preferred feature of the invention, the diaphragm may have a weakened section adapted to rupture if the pressure in the tyre exceeds that in the chamber by a predetermined amount. If such a diaphragm is used, when the device is fitted to an over inflated tyre, the indicator will briefly indicate adequate tyre pressure and then on rupture of the diaphragm, that all is not well.

The inlet of the device preferably has a screw threaded bore and at the end of the bore an axial nose which is positioned to depress the central pin of and therefore open, a conventional tyre valve. To ensure that the valve and device are in sealed contact and to prevent the escape of air from within the tyre, the inlet preferably contains an appropriately located O-ring.

A tyre pressure indicating device according to the present invention may thus easily be fitted onto any conventional tyre valve to display a clear visual signal which indicates the air pressure condition of the tyre. It may be mass produced inexpensively in quantity. It is also lightweight, self-contained and provides an indication of self-failure.

Figure 2:
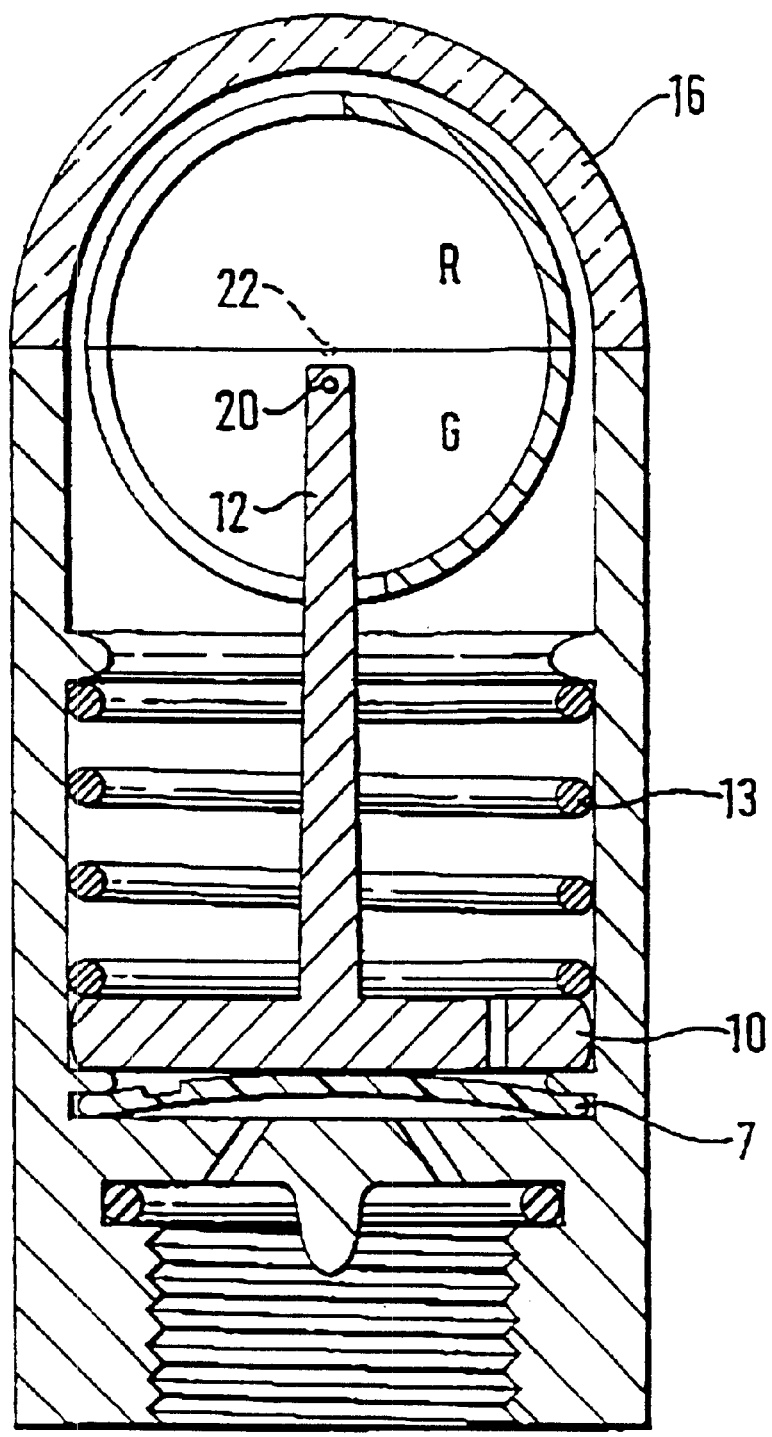

A device according to the invention will now be described, by way of example only, with reference to the accompanying drawings in which:

FIG. 1 is a diagrammatic vertical section through a tyre pressure indicating device according to the invention, wherein the diaphragm is in the fully flexed position, FIG. 2 is the device of FIG. 1 wherein the diaphragm is in the position taken when the inlet is not mounted on a tyre valve.

With reference to FIG. 1, a low tyre pressure warning device 2, having a generally cylindrical casing 9, is mounted onto a vehicle tyre valve by screw-threading on to the valve housing 1. A nose 6 at the end of a threaded bore 4 in the casing of device 2 depresses the central pin 21 of the valve. An O-ring 5 ensures a sealed contact between the device and the valve housing 1. Depressing pin 21 allows pressurised air from the tyre to enter, via inclined ports 3, the space between the nose 6 and a flexible impermeable diaphragm 7 sealed to the casing 9.

The flexible diaphragm 7 spans the inlet and is held in position by a flange 11 on the inner wall of casing 9. It has a weekened region 18 which will rupture if the pressure in the inlet exceeds that in chamber 8 by more than a predetermined amount.

Within casing 9, a chamber 8 above the diaphragm 7 as shown in the drawings is pressurised and is completely permanently hermetically sealed during manufacture of the device. This chamber 8 contains a piston 10 urged by a compression spring 13 towards diaphragm 7. Spring 13 seats on an annular bead 24 in casing 9. A piston rod 12 extends upwardly and is pivoted to a shaft 20 not quite running through the centre of a dual colour ball 14. Ball 14 has on its exterior two small pins defining an axis of rotation 22, and which are seated in two corresponding formations in the inner wall of casing 9, so mounting ball 14 rotatably about axis 22 within the casing. The ball 14 is visible from the exterior of the device through a transparent lens region 16 of the casing 9. One half is denoted G and is green in colour, the other half, denoted R, being red. Rod 12 passes through an arcuate slot in the ball. Piston 10 has a perforation bore 17 to ensure that the pressure is equal on each side of the piston.

The chamber 8 is hermetically sealed during manufacture at a pressure higher than atmospheric but slightly lower than the optimal pressure of the tyre to which the device is to be secured. Therefore, when the tyre pressure is optimum, the higher pressure behind the diaphragm 7 causes it to flex to the position shown in FIG 1. This movement of the diaphragm, when the device is threaded on to the tyre valve, causes the piston 10 and rod 12 to rise to the position as shown in FIG. 1 and accordingly to rotate the ball 14 so that its green half G is visible through the transparent lens 16. This provides a clear visual signal which indicates that the pressure in the tyre is sufficiently above the pressure in chamber 8 to overcome the force exerted by spring 13.

However, if, for example, a tyre to which the device is attached develops a slow puncture, the tyre pressure reduces. This reduction in pressure behind the flexible diaphragm 7 causes it to flatten as the pressure of the tyre and of the sealed chamber equalize. When the pressures are approximately equal, the flexible diaphragm 7 is flat and the piston 10 and rod 12 consequently drop under the influence of spring 13, to the position shown in FIG. 2.

This downward movement causes ball 14 to rotate so that the red half R is now visible through the transparent lens 16, accordingly providing a clear visual signal which indicates that the tyre pressure has reduced.

As will be appreciated, the ball may bear further colours in order to indicate an intermediate stage between the fully flexed position and fully flattened position of the diaphragm.

The device of the invention enables the easy detection of a slow puncture, or the like, in a vehicle tyre before it would usually be perceived from observation of the tyre alone, especially with modern "low-profile" tyres. The device may easily be produced in a range of "changeover" pressures to match the range of recommended tyre pressures across a wide range of motor vehicles. If desired, two sets of such devices may be provided as standard, one for use when the vehicle is unladen or only lightly loaded, the other for use when the vehicle is laden where slightly higher tyre pressures are often recommended.

It should be noted that the device of the invention, if it is itself subject to failure, e.g. by rupture of diaphragm 7, immediately indicates such failure to the user; when, after pressurising the tyre to the correct pressure, the device is fitted on to the tyre valve stem, the chamber 8 pressure rises to equal the tyre pressure but, because of spring 13, the mechanical linkage does not move, so the tyre still appears under-pressurised. Failure of the ball to turn when the device is fitted back on is immediately apparent.

Likewise, if the seal ring 5 should fail, or the casing crack adjacent the seal ring by being screwed on too tightly, then the pressure in the tyre will drop and the indicator will turn red.

If the seal of chamber 8 should fail, the substantial pressure differential will rupture diaphragm 7 at region 18 which thus acts as a bursting diaphragm. It will also rupture if the pressure in the inlet exceeds the pressure in the chamber 8 by more than a given threshold e.g. if the pressure in the tyre is greater than twice the pressure in the chamber 8. The device will thus fail if the tyre onto which it is screwed is subject to gross over-pressure, thus giving a very positive indication to the user, when the device is screwed onto the valve stem, that something is seriously wrong.

In an alternative approach to providing a weakened region 18, loss of pressure in chamber 8, or gross tyre over-pressure, can cause the stem 12 to buckle and e.g. release something in the chamber which will cause the window to adopt a different appearance.

The foregoing specific description of a preferred embodiment and the generality of the description of the invention have been directed to the use of the device in connection with tyres but the device is not restricted to such use. Thus it may be used in analogous situations where it is desired to monitor any drop in pressure below a preset desired figure, for example to monitor the condition of pressurised fire extinguishers, to monitor bladder pressure in hydraulic accumulators and for monitoring the integrity of closed tubes. In this last application, a closed tube e.g. in a mechanical or civil engineering structure, has its interior pressurised to a given value and a device in accordance with the invention then attached. If a crack appears in the tube or e.g. at a weld at one end of the tube, the pressure within the tube will drop and this can be immediately perceived by looking at the device of the present invention attached thereto.

What is claimed is:

1. A pressure indicating device comprising a housing which includes
    an inlet for air under pressure;
    a permanently hermetically sealed chamber sealed during manufacture of the device, said chamber containing a gas under pressure;
    a signaling device constructed and arranged to provide a signal that depends on pressure difference between the inlet and the chamber;
    a flexible impermeable diaphragm separating the inlet and the chamber, the diaphragm constructed and arranged to flex and extend into the chamber as pressure at the inlet increases; and
    a connecting means between the diaphragm and the signaling device to actuate the signaling device to provide a signal indicative of inlet pressure relative to pressure of the sealed chamber.

2. The pressure indicating device of claim 1, wherein the signaling device is located within the chamber.

3. The pressure indicating device of claim 1, wherein the inlet is adapted to open a tire valve and form a sealed contact with said tire valve.

4. The pressure indicating device of claim 3, wherein the chamber is pressurized to a pressure just below that of an optimal tire pressure for a particular vehicle and vehicle load condition.

5. The pressure indicating device of claim 1 or 2, wherein the inlet includes a nose adapted to depress a central pin of a valve as the device is attached to the valve.

6. The pressure indicating device of claim 5, wherein the inlet comprises a seal adapted to seal the device to the valve.

7. The pressure indicating device of claim 1, 2, 3 or 4, wherein the signaling device is capable of providing at least two distinguishable signals.

8. The pressure indicating device of claim 7, wherein the signaling device is mechanical.

9. The pressure indicating device of claim 8, wherein the signaling device comprises a rotatably mounted ball having at least two colored regions.

10. The pressure indicating device of claim 1, wherein the device is a visual indicator that is perceptible over a viewing angle of at least 110°.

11. The pressure indicating device of claim 1, wherein the connecting means comprises mechanical linkages.

12. The pressure indicating device of claim 11, wherein the connecting means comprises an arrangement of a piston, an elongate member and a crank means, and wherein the piston is mounted to lie against the diaphragm, the crank means is attached to the signaling device, and the elongate member extends between the piston and the crank means.

13. The pressure indicating device of claim 12, wherein the piston is spring biased toward the diaphragm.

14. The pressure indicating device of claim 1, wherein the diaphragm is constructed as or incorporates a bursting disc.

15. The pressure indicating device of claim 14, wherein the bursting disc is constructed and arranged to rupture when applied pressure on a side of the diaphragm remote from the chamber exceeds twice the pressure in the chamber.

* * * * *